United States Patent
Fisher et al.

(10) Patent No.: US 6,947,843 B2
(45) Date of Patent: Sep. 20, 2005

(54) MICROSEISMIC SIGNAL PROCESSING

(75) Inventors: Andrew Fisher, Cornwall (GB); Robert Hughes Jones, Cornwall (GB); Andrew Jupe, Cornwall (GB); Stephen Wilson, Cornwall (GB)

(73) Assignee: Vetco Grey Controls Limited, Bristol (GB)

( * ) Notice: Subject to any disclaimer, the term of this patent is extended or adjusted under 35 U.S.C. 154(b) by 0 days.

(21) Appl. No.: 10/381,554

(22) PCT Filed: Jul. 25, 2002

(86) PCT No.: PCT/GB02/03441

§ 371 (c)(1),
(2), (4) Date: Jun. 26, 2003

(87) PCT Pub. No.: WO03/014768

PCT Pub. Date: Feb. 20, 2003

(65) Prior Publication Data

US 2004/0008580 A1 Jan. 15, 2004

(30) Foreign Application Priority Data

Aug. 7, 2001 (GB) .............................................. 0119248

(51) Int. Cl.$^7$ ................................................ G01V 1/28
(52) U.S. Cl. ......................................................... 702/13
(58) Field of Search ............................ 702/12, 13, 14, 702/15, 16, 18; 703/10; 367/73

(56) References Cited

U.S. PATENT DOCUMENTS

| | | | |
|---|---|---|---|
| 5,377,104 A | | 12/1994 | Sorrells et al. |
| 5,963,508 A | | 10/1999 | Withers |
| 5,996,726 A | * | 12/1999 | Sorrells et al. ............. 181/106 |
| 6,131,658 A | * | 10/2000 | Minear .................. 166/250.01 |
| 6,442,489 B1 | * | 8/2002 | Gendelman et al. .......... 702/12 |
| 6,462,549 B1 | * | 10/2002 | Curtis et al. ................. 324/323 |

FOREIGN PATENT DOCUMENTS

| | | |
|---|---|---|
| GB | 2349222 | 10/2000 |
| WO | WO 99/42857 | 8/1999 |
| WO | WO 00/23821 | 4/2000 |
| WO | WO 00/33107 | 6/2000 |

OTHER PUBLICATIONS

Salehi, I.A.; "Horizontal Drilling for Onshore Gas Faces Many Challenges" Oil and Gas Journal, Pennwell Publishing Co., Tulsa, US; vol. 90 No. 40; Oct. 5, 1992; pp. 61–63,66–69.

Wills, P.B., et al; "Active and Passive Imaging of Hydraulic Fractures" Geophysics; The Leading Edge of Exploration Tulsa, OK, US; vol. 7 No. 11; Jul. 1, 1992; pp. 15–22.

* cited by examiner

*Primary Examiner*—Donald McElheny, Jr.
(74) *Attorney, Agent, or Firm*—Bracewell & Giuliani LLP

(57) ABSTRACT

Signals from microseismic events are used to obtain a parameter of reservoir such as porosity, permeability or saturation.

15 Claims, 3 Drawing Sheets

MICROSEISMIC SIGNAL PROCESSING

Figure 1:
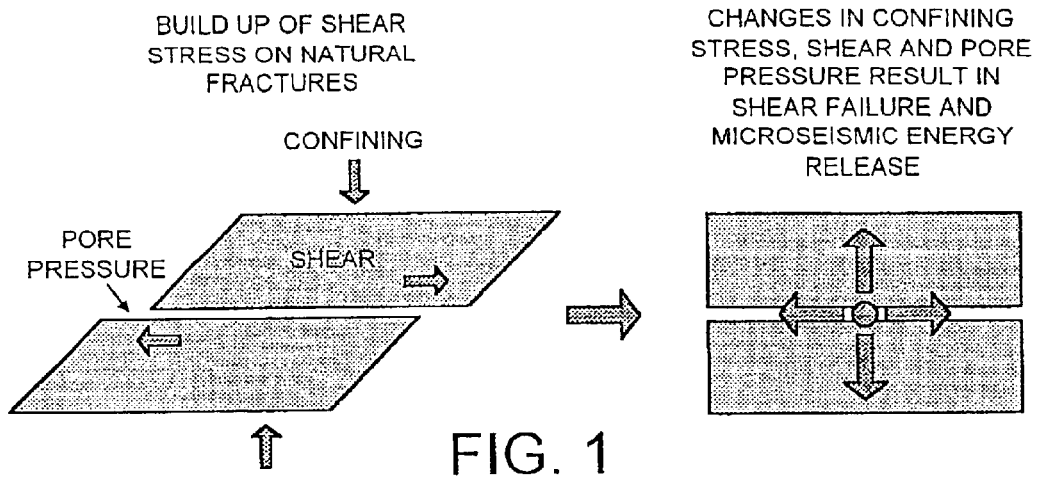

The present invention relates to microseismic signal processing.

Microearthquakes (microseismic events) are known to be induced during hydrocarbon and geothermal fluid production operations. They typically, but not exclusively, result from shear-stress release on pre-existing geological structures (e.g. faults and fractures) due to production/injection induced perturbations to the local effective earth stress conditions. They might also be caused by rock failure through collapse (e.g. compaction) or through the propagation of failure planes through tensile fracture propagation (e.g. hydraulic fracturing). These induced microseismic events may be induced or triggered by reservoir processes such as depletion, flooding or stimulation, in other words the extraction or injection of fluids. The signals from these microseismic events can be detected in the form of elastic waves transmitted from the source location to remote sensors. These signals contain valuable information on the physical processes taking place within a reservoir. These processes can be mechanical, hydraulic or chemical in origin or are coupled processes involving one or more of these.

Various forms of microseismic monitoring hardware, particularly related to geothermal and hydrocarbon reservoirs, are known and it is also known to use microseismic signals to monitor hydraulic fracturing and waste re-injection.

Throughout the life of a hydrocarbon reservoir, the production process (including extraction and injection of fluids) induces physical changes within the reservoir. These changes result in perturbations to the in situ stress conditions and physical properties that propagate out through the reservoir from the source of the perturbations (i.e. injection or extraction boreholes).

A direct consequence of these perturbations is the re-activation of pre-existing reservoir structures such as faults and fractures, which manifests itself as small earthquakes, referred to as microearthquakes or microseismic activity. This stress relaxation process takes place in all reservoirs, but in mature fields and fracture dominated reservoirs the pressure and stress changes tend to be more severe and the seismic activity more intense. The following are three situations in which induced microseismic activity is likely and has been demonstrated to occur.

Reservoir depressurization can lead to localized reservoir compaction, or on a reservoir scale to compaction assisted or compaction driven production. In several North Sea fields where compaction is taking place, there are associated problems of wellbore stability and integrity. Large scale depressurization near fault sealed or fault compartmentalized reservoirs will lead to fault re-activation and the potential for pressure breakthrough into neighboring reservoir compartments or even fields.

Enhanced recovery, particularly in mature fields, can require massive injection and flooding programmes aimed at pressure maintenance. Even in moderately fractured reservoirs the efficiency of these operations is known to be strongly affected by anisotropic or heterogeneous flood patterns.

Re-injection is a common approach to the disposal of waste from development and in-fill drilling, from increased solids and water production, and ultimately it may be used in seafloor waste recovery and disposal prior to decommissioning. However, the question-being asked by operators and regulators is how can this process of re-injection be managed and the size and shape of disposal domains monitored.

Microseismic events are basically small earthquakes, typically, but not exclusively, Richter magnitude $(M_L)<3$, and to date they have been detected and located at distances of over 1 km from the monitoring well in hydrocarbon reservoirs. They occur because the earth stresses acting within the reservoir are anisotropic. This causes shear stresses to build up on naturally occurring fracture surfaces that under normal conditions are locked together and when the in situ stresses are perturbed by reservoir production activity, such as changing fluid pressures, the fracture's shear producing small earthquakes (FIG. 1). The seismic signals from these microseismic events can be detected and located in space using high bandwidth borehole sensors. Microseismic activity has been successfully detected and located in rocks ranging from unconsolidated sands, to chalks to crystalline rocks.

The present invention involves methods for estimating and deriving information on the physical processes taking place within hydrocarbon reservoirs from detected microseismic signals, using appropriate receivers such as seismic sensors, located remote from the induced or triggered microseismic source.

Examples of the present invention use microseismics to:

Identify fault structures that can result in reservoir compartmentalisation or act as flow channels and routes for premature water breakthrough.

Image flow anisotropy associated with production from fracture dominated reservoirs.

Provide real-time 3D monitoring of fluid pressure front movement, such as water flood fronts.

Assist in targeting new producer/injector wells.

Identify areas of reservoir compaction and potential wellbore instability.

Provide input to and condition permeability and connectivity properties for reservoir simulation.

The key to the invention is that, although microseismic event locations have previously been used to determine the position of structure (e.g. faults) in reservoirs (i.e. spatial information), they have not been used in any quantitative manner to obtain reservoir parameters, such as porosity, permeability, saturation (i.e. reservoir property information). Such parameters are key to the control of fluid extraction production processes and allow the planning of production and development plans for fields.

The present invention involves methods for using information on physical processes taking place within a reservoir from microseismic signals detected using appropriate receivers (seismic sensors) located remote from the induced or triggered microseismic source. These processes can be mechanical, hydraulic or chemical in origin or are coupled processes involving one or more of these. The method can involve processes investigated at just one instance during operation of the hydrocarbon reservoir and/or through comparison with a similar process investigated at some prior or future instance (i.e. time-lapse). The method also includes the integration and correlation of the microseismic data with any other reservoir data type, including pressure, flow rate, geophysical logs and seismic reflection data obtain at one or more instance in time Specific reservoir properties of interest that can be estimated from microseismic data include:

Porosity

Permeability (including relative gas, oil water permeabilities)

Fluid saturations (gas, oil water)

Stress

Seismic velocity

Rock strength parameters (e.g. compressive strength)

According to the present invention from a first aspect, there is provided a method of monitoring a reservoir, wherein a characteristic of a microseismic signal is used to investigate a process or property occurring at the source location of an individual microseismic event (as defined by a seismic source volume with a radius with the event located at the centre of the volume).

The above method involves quantitative analysis of the seismic signal to obtain a reservoir parameter based on some theoretical or empirical model of the seismic source mechanism and/or estimation of a reservoir parameter based on an empirical relationship relating a time, frequency or other domain characteristic of the seismic signal to a known or derived reservoir property determined through some exploration method (e.g. a borehole sampling the reservoir or seismic reflection image)

According to the present invention from a second aspect, there is provided a method of monitoring a reservoir, wherein the spatial and temporal relationship and/or comparison of seismic waveforms between adjacent microseismic events is used to estimate a reservoir property in the region between and including the individual event locations.

As with the invention from the first aspect, the method may involve quantitative analysis of the seismic signal to obtain a reservoir parameter based on some theoretical model of the seismic source mechanism and/or estimation of a reservoir parameter based on an empirical relationship relating a time or frequency domain characteristic of the seismic signal to a known or derived reservoir property determined through some exploration method (e.g. a borehole sampling the reservoir)

According to the present invention from a third aspect, there is provided a method of monitoring a reservoir wherein the microseismic signal is used to investigate a process occurring at any location between source and receiver locations at some point on the raypath of the wave travelling between source and receiver.

The method may use some means of separating the effect of a reservoir property on the seismic waveform from some specified point on the raypath from the integrated effect of all other points on the raypath between source and receiver. Such analysis may be used to determine a reservoir parameter at some point (e.g. a seismic velocity) or to estimate a parameter based on an empirical relationship relating a time or frequency domain characteristic of the seismic signal to a known or derived reservoir property determined through some exploration method (e.g. a borehole sampling the reservoir).

According to the present invention from a fourth aspect, there is provided a method of monitoring a reservoir, wherein a characteristic of a microseismic signal from one or more events is used to investigate a process or property occurring at a location remote from the source, but not necessarily on a raypath of a wave travelling between source and receiver. The method may involve the use of a single event to investigate a property or by considering the cumulative effect of many such events.

Figure 2:
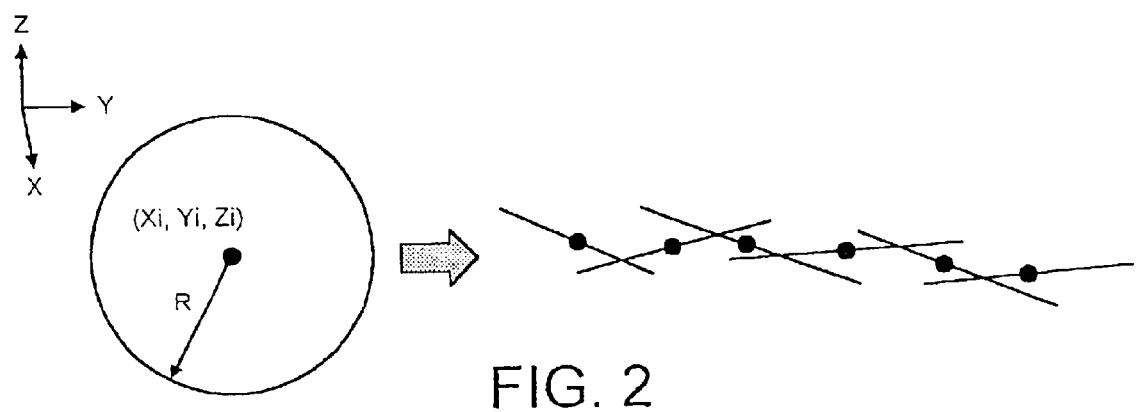

Referring to FIG. 2, in a method according to an example of the first aspect, the seismic waveforms can be used to define a discrete planar geological discontinuity that may represent a fault or fracture plane. At least 3 parameters can be derived from microseismic waveforms received at one or more receivers using various models of physical processes taking place at the source. 1) The source location in space and time. 2) The frequency content of the signal can be analysed to provide an estimate of equivalent radius of the fracture plane that generates the microseismic event. 3) Analysis of the polarity of the seismic signal and the relative amplitude of different seismic phases at one or more sensors allows the orientation of the failure plane in space to be determined.

The method may also involve using the planar structures defiled by these 3 parameters to construct an intersecting network of fracture planes that control the magnitude and principal axes of the permeability tensor and hence fluid flow within a reservoir. This permeability information is then used as an input into a numerical model of fluid flow in the reservoir and used to make predictions of reservoir processes resulting from production or fluid injection wells.

Figure 3:
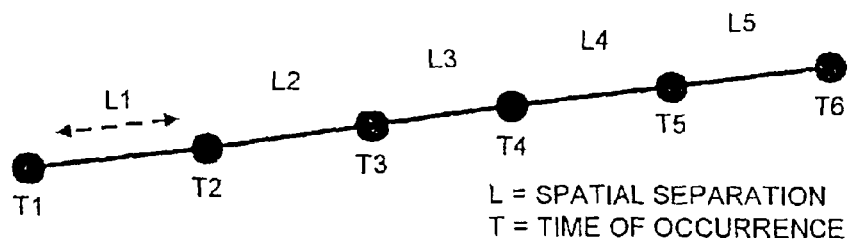

Referring to FIG. 3, in a method according to an example of the second aspect, it can be demonstrated that in certain cases there is a strong similarity in the characteristics of seismic events (e.g. similarity of waveforms, proximity in space and time). Such events are sometimes known as doublets (2 similar events) or multiplets (three or more similar events). The association of these events could, for example, be indicative of the passage of fluid between the source locations over a certain time and therefore the permeability of the intervening region.

The example in FIG. 3 represents microseismic events (e.g. multiplets) occurring at times T1 to T1+n due to an increase in fluid pressure due to fluid injection, from a water injector well for example. The spatial distance between each event is given by L1 to L1+n−1. The time at which each event occurs is related to the movement of fluid pressure through the reservoir. Therefore the spatial and temporal relationship of the microseismicity provides information on the pressure front velocity and fluid conductivity (K) using the general form of equation $K \propto L1/(T1+1-T1)$ for example. Estimates of conductivity obtained in this way can be used as input to reservoir models and used to make predictions of fluid flow in a reservoir, hence improving production.

Figure 4:
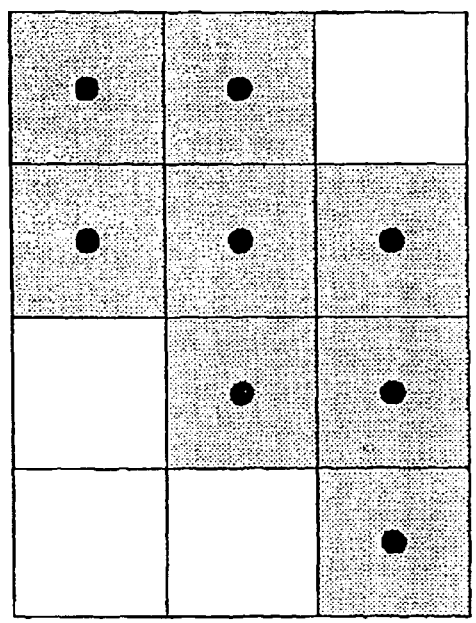
Figure 4:
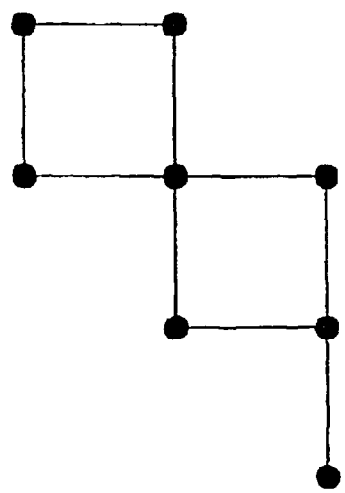

Referring to FIG. 4, a volume containing seismic events can be divided into smaller discrete volumes or cells (e.g. cubes). These cells can be defined as seismically active or passive (quiet) based on the number of events occurring within the cell, the cumulative energy release or some other combination of parameters. In the case where the seismic events are due to fluid pressure increase, such as a programme of water injection to maintain reservoir pressure (e.g. from a waterflood), there is a finite probability that any two adjacent cells that are microseismically active are also connected hydraulically.

The connection can therefore be represented by a hydraulic pipe with a length and conductivity estimated from the spatial separation and the seismic parameters used to define the cells, respectively. By examining each block in turn it is possible to construct a network of pipes that can provide an estimate of the hydraulic conductivity distribution in a reservoir volume. Cells with no activity represent areas with no hydraulic connection. The network of pipes forms a conductivity or permeability grid that can be input into a numerical reservoir model and used to male predictions for fluid flow and hence help improve reservoir management and recovery.

Figure 5:
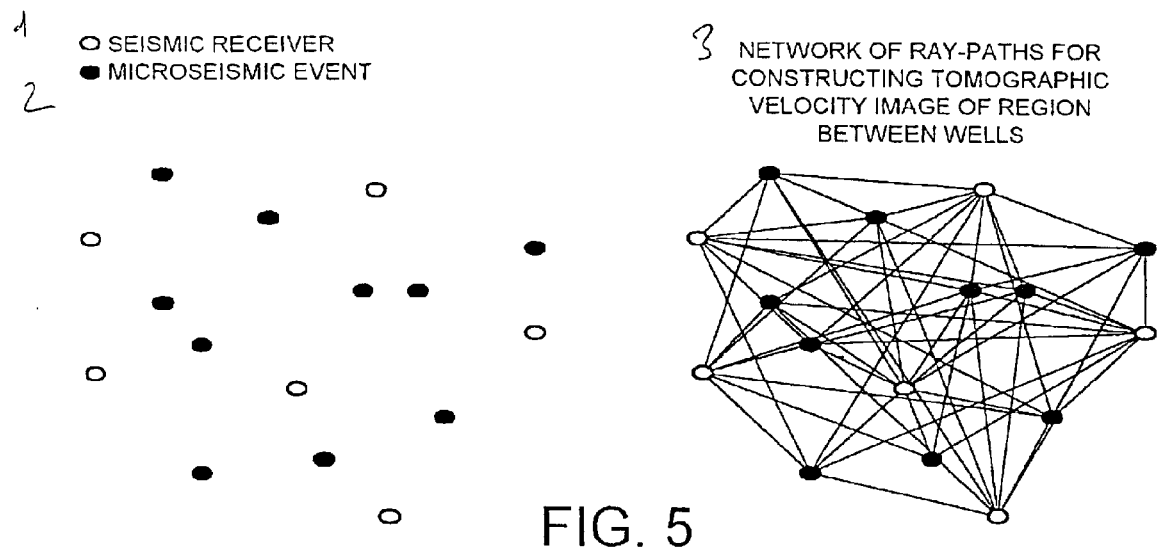

Referring to FIG. 5, in a method according to an example of the third aspect, microseismic events are used as sources for creating a tomographic image between wells. Each event produces a raypath from a source to a receiver. The waveform therefore expresses the integrated or averaged effect of this varying property over the whole seismic raypath length. Examples of such properties are velocity, attenuation or shear-wave birefringence. For example, the travel time from source to receiver represents the integrated effect of the travel time over discrete unit length sections of the whole raypath. For a single raypath this gives an average velocity, but no information about discrete reservoir volumes can be determined. However if there are intersecting rays, the problem becomes over constrained/determined. In particular, it is possible to calculate information at points of intersection of raypaths in a manner known as tomography. For example, by dividing the reservoir into discrete cells and setting up a system of equations relating average velocity (V) to travel time over each cell (t) and cell length (L) (i.e. V=dt). The Inversion of the matrix of travel times and separations gives a grid of velocities. It is then possible to relate these velocities to reservoir properties such as permeability or porosity and use them to improve reservoir models.

Figure 6:
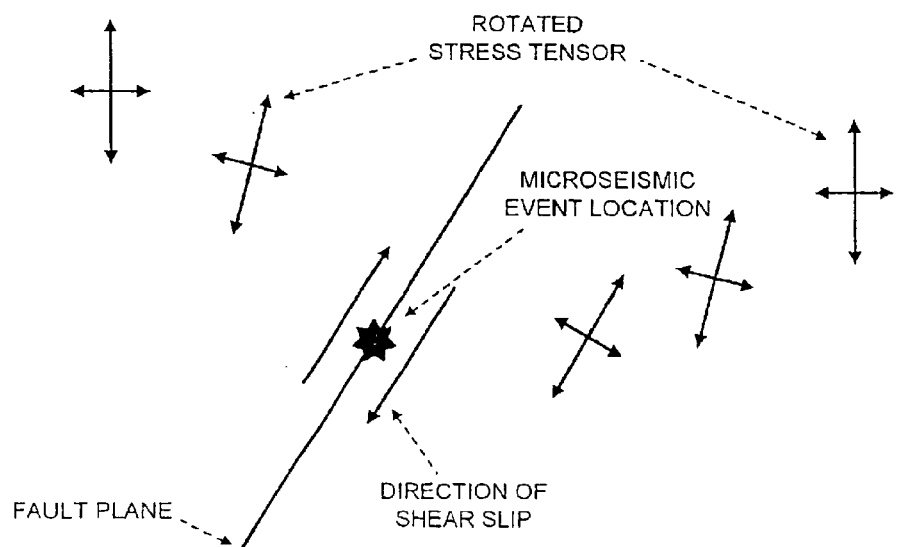

Referring to FIG. 6, in a method according to an example of the fourth aspect, seismic waveforms can be used to define discrete planar geological discontinuities that may represent a fault or fracture plane (as in the first and second aspects of the invention). A further characteristic of the waveform could then be used to provide an estimate of shear displacement along the fault during the failure that produces the microseismic event. This information on these local properties (such as displacement on a fault) could then be used to determine or constrain properties (such as the stress state) at remote locations either directly from the property or through the use of a mathematical model. In the example of FIG. 6 stress tensor rotations around a fault structure could be determined or constrained by geomechanical models of the reservoir where an input or boundary condition to the model is the fault displacement determined from the microseismic event.

What is claimed is:

1. A method of monitoring a reservoir by detecting a microseismic signal produced by a microseismic event, the method being applicable both for events induced by injection and extraction of fluid into and out of the reservoir, wherein a characteristic of a microseismic signal is used to investigate a process or property occurring at the source location of an individual microseismic event (as defined by a seismic source volume with a radius with the event located at the center of the volume).

2. A method according to claim 1, involving quantitative analysis of the seismic signal to obtain a reservoir parameter based on a theoretical model of the seismic source mechanism and/or estimation of a reservoir parameter based on an empirical relationship relating a time or frequency domain characteristic of the seismic signal to a known or derived reservoir property determined through an exploration method.

3. A method of monitoring a reservoir by detecting a microseismic signal produced by a microseismic event, the method being applicable both for events induced by injection and extraction of fluids into and out of the reservoir, wherein the spatial and temporal relationship and/or comparison of seismic waveforms between adjacent microseismic events is used to estimate a reservoir property in the region between and including the individual event locations.

4. A method according to claim 3, involving quantitative analysis of the seismic signal to obtain a reservoir parameter based on a theoretical model of the seismic source mechanism and/or estimation of a reservoir parameter based on an empirical relationship relating a time or frequency domain characteristic of the seismic signal to a known or derived reservoir property determined through an exploration method.

5. A method of monitoring a reservoir by detecting a microseismic signal produced by a microseismic event, the method being applicable both for events induced by injection and extraction of fluid into and out of the reservoir, wherein a microseismic signal is used to investigate a process occurring at any location between source and receiver locations at some point on a raypath of a wave traveling between source and receiver.

6. A method according to claim 5, which uses a means of separating the effect of a reservoir property on the seismic waveform from some specified point on the raypath from the integrated effect of all other points on the raypath between source and receiver.

7. A method according to claim 6, used to determine a reservoir parameter at some point or to estimate a parameter based on an empirical relationship relating a time or frequency domain characteristic of the seismic signal to a known or derived reservoir property determined through an exploration method.

8. A method of monitoring a hydrocarbon reservoir by detecting a microseismic signal produced by a microseismic event, the method being applicable both for events induced by injection and extraction of fluid into and out of the reservoir, wherein a microseismic signal from one or more events is used to investigate a process occurring at location remote from the seismic event and not necessarily on a raypath between the source and receiver.

9. A method according to claim 8, which involves the use of a single event to investigate a property or by considering the cumulative effect of many such events.

10. A method according to claim 1, the method including:
providing a plurality of seismic sensors located remote from a plurality of microseismic sources;
detecting microseismic signals from the plurality of microseismic sources;
comparing microseismic waveforms of the detected microseismic signals to a model of physical processes occurring at each of the microseismic sources;
deriving, responsive to the comparison, a source location in space and in time for each of the microseismic sources;
analyzing a frequency content of the microseismic signal to estimate an equivalent radius of a fracture plane generating the microseismic event; and
analyzing a polarity of each microseismic signal and relative amplitude of different microseismic phases at at least one of the plurality of seismic sensors, to thereby determine an orientation in space of the failure plane generating the microseismic event.

11. A method according to claim 3, the method including:
providing a plurality of seismic sensors located remote from a plurality of microseismic sources;
detecting microseismic events having similarity of microseismic waveforms, proximity in space, and proximity in time, the microseismic events indicating passage of fluid between adjacent microseismic locations;
determining the spatial and temporal relationship of the microseismic events to thereby estimate pressure front velocity and fluid conductivity; and
predicting fluid flow in the reservoir, responsive to the estimated fluid conductivity, to thereby enhance fluid production.

12. A method according to claim 3, the method including:
providing a plurality of seismic sensors located remote from a plurality of microseismic sources;

detecting microseismic events from the plurality of microseismic sources;

preselecting a volume containing the detected microseismic sources;

dividing the preselected volume into a plurality of smaller discrete volumes defining volume cells;

analyzing microseismic activity within each volume cell to thereby define each volume cell as either active or passive;

modeling a hydraulic connection between each active volume cell and the other active volume cell, the hydraulic connection having a length and a conductivity estimated from a spatial separation between the adjacent volume cells and seismic parameters used to determine volume cell activity, thereby forming a network of interconnected hydraulic connections defining a conductivity grid; and inputting the conductivity grid into a preselected numerical reservoir model to predict reservoir fluid flow to thereby improve reservoir management and recovery.

13. A method according to claim 12, wherein the volume cells are cubic.

14. A method according to claim 5, the method including:

providing a plurality of seismic sensors located remote from a plurality of microseismic sources;

preselecting a volume containing the microseismic sources;

assigning a raypath between each microseismic source and at least one of the plurality of seismic sensors, each raypath providing an average velocity of a microseismic waveform between the source and the sensor;

determining a point of an intersection of the intersecting raypath;

dividing the preselected volume into a plurality of discrete cells each having a cell length;

forming a matrix of equations relating average waveform velocity to waveform travel time over each cell and the cell length;

inverting the matrix to form a grid of velocities; and relating the grid of velocities to reservoir properties, to thereby improve reservoir modeling.

15. A method according to claim 8, the method including:

detecting a microseismic event from a microseismic source;

estimating shear displacement along a fault structure during a failure that produces the microseismic event from the received waveform; and determining stress tensor rotations around the fault structure, responsive to the determined fault shear displacement.

* * * * *